(No Model.)
M. L. SENDERLING.
DUMP WAGON.
No. 492,562. Patented Feb. 28, 1893.
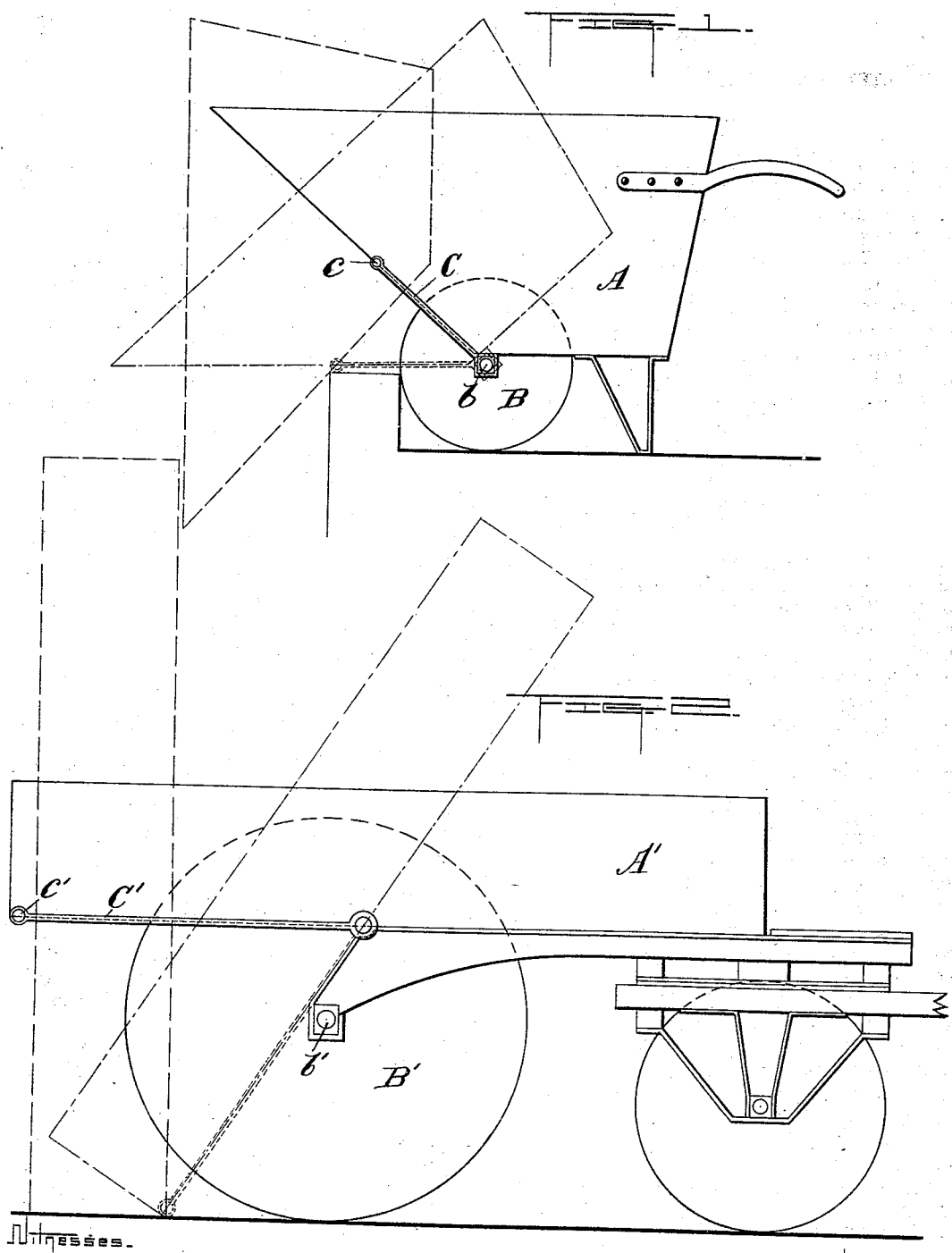

UNITED STATES PATENT OFFICE.

MARTIN L. SENDERLING, OF JERSEY CITY, NEW JERSEY.

DUMP-WAGON.

SPECIFICATION forming part of Letters Patent No. 492,562, dated February 28, 1893.

Application filed June 16, 1892. Serial No. 436,911. (No model.)

*To all whom it may concern:*

Be it known that I, MARTIN L. SENDERLING, of Jersey City, in the county of Hudson and State of New Jersey, have invented a new and useful Improvement in Dump-Wagons, of which the following is a specification.

My invention relates to an improvement in dumping wagons in which the body after being tilted until it strikes the ground or a rest independent of the vehicle, is permitted a still farther tilting movement upon the ground or independent rest to throw the body bodily over to the rear of the axle in position to discharge its load.

A practical embodiment of my invention is represented in the accompanying drawings in which Figure 1 represents a two wheeled vehicle in side elevation, showing in dotted lines different positions which the body assumes in tilting to dump and Fig. 2 represents a four-wheeled vehicle also showing in dotted lines the position which the body assumes when tilting to dump.

The particular class of vehicle which I have represented in Fig. 1 is a hand barrow, but so far as my present invention is concerned it is equally applicable to a corresponding two wheeled vehicle arranged for being drawn by other than hand power.

A represents the body of the vehicle, B one of the wheels. I have omitted to show the wheel on the side toward the observer in order to more clearly disclose the body and its support. When in normal position the body A rests with its load, upon the axle $b$. Swinging links C, one at each side of the body, are connected at one end to the axle $b$ and at their opposite ends to pivots $c$ on the body A. In the present instance I have shown the pivot $c$ located at the rear end of the body and about half way between its top and bottom. The body while resting upon the axle $b$ when conveying its load, is free to be swung bodily away from the axle during the process of dumping.

The particular form of body which I have shown in Fig. 1 is intended for dumping off from a platform, staging or dock log and, when the body is at first tilted, it will rock upon the axle $b$ until the rear end of the body reaches the edge of the platform over which it is to dump its load. When the rear end of the body rests with its pivot $c$ upon the edge of the platform the body may be given a still farther tilting movement upon the pivot $c$ throwing it into a position substantially at right angles to its normal position, where it will readily free itself from its load. It will be observed that during the operation of tilting the entire body of the vehicle has been moved rearwardly more than half its extreme length and has thereby carried the load well to the rear of the axle and wheels to be discharged.

In the form of vehicle shown in Fig. 2, the body of the wagon is represented by A', one of the rear wheels by B', the swinging link by C', the pivotal connection of the link with the body by $c'$ and the axle by $b'$. In this instance the pivot $c'$ is located at the rear end and at the bottom of the body so that when the body A' is tilted until its rear end strikes the ground, it may be still farther tilted upon $c'$ as a pivot, throwing the entire body off from and to the rear of its normal support into a position substantially at right angles with its normal position.

It is to be understood that the structure of the wheels and supporting frame of the vehicle and the particular shape of the body may be varied to suit the various purposes to which the vehicle may be put.

What I claim is—

1. A dumping vehicle comprising a body, a swinging link connecting the body with its support the body being free to tilt rearwardly away from its normal support upon a support independent of the vehicle, substantially as set forth.

2. A dumping vehicle comprising a body, swinging links connecting the rear end of the body with its support, said links being sufficiently long to permit the body to swing into engagement with the ground or a support independent of the vehicle, the said body being free to swing away from its normal support on the ground or other support independent of the vehicle, substantially as set forth.

MARTIN L. SENDERLING.

Witnesses:
FREDK. HAYNES,
GEORGE BARRY.